United States Patent
Lindkamp (10) Patent No.: US 8,986,036 B2
(45) Date of Patent: Mar. 24, 2015

(54) PLUG CONNECTOR

(75) Inventor: Marc Lindkamp, Luebbecke (DE)

(73) Assignee: Harting Electronics GmbH, Espelkamp (DE)

( * ) Notice: Subject to any disclaimer, the term of this patent is extended or adjusted under 35 U.S.C. 154(b) by 0 days.

(21) Appl. No.: 13/995,661

(22) PCT Filed: Aug. 3, 2011

(86) PCT No.: PCT/DE2011/075185
§ 371 (c)(1),
(2), (4) Date: Jun. 19, 2013

(87) PCT Pub. No.: WO2012/083936
PCT Pub. Date: Jun. 28, 2012

(65) Prior Publication Data
US 2013/0280932 A1 Oct. 24, 2013

(30) Foreign Application Priority Data

Dec. 21, 2010 (DE) .......................... 10 2010 055 434

(51) Int. Cl.
*H01R 13/627* (2006.01)
*H01R 13/62* (2006.01)
*G02B 6/42* (2006.01)
*H01R 13/633* (2006.01)

(52) U.S. Cl.
CPC .............. *H01R 13/62* (2013.01); *G02B 6/4246* (2013.01); *G02B 6/4261* (2013.01); *G02B 6/4284* (2013.01); *G02B 6/4292* (2013.01); *H01R 13/6275* (2013.01); *H01R 13/6335* (2013.01)
USPC ......... 439/352; 439/476.1; 439/484; 439/160

(58) Field of Classification Search
USPC ...................... 439/157, 160, 352, 476.1, 484; 385/92–93
See application file for complete search history.

(56) References Cited

U.S. PATENT DOCUMENTS

| | | | |
|---|---|---|---|
| 6,855,558 B1 | 2/2005 | Hattori | |
| 7,297,028 B2 | 11/2007 | Daikuhara et al. | |
| 7,507,111 B2 * | 3/2009 | Togami et al. | 439/484 |
| 7,690,939 B2 | 4/2010 | Wu | |
| 8,444,430 B2 * | 5/2013 | Kappla et al. | 439/352 |
| 2006/0043089 A1 | 3/2006 | Okushima | |
| 2009/0227133 A1 | 9/2009 | Zhang et al. | |
| 2009/0244856 A1 | 10/2009 | Pirillis | |
| 2013/0273766 A1 * | 10/2013 | Lindkamp | 439/345 |
| 2013/0280932 A1 * | 10/2013 | Lindkamp | 439/152 |
| 2014/0179143 A1 * | 6/2014 | Kappla et al. | 439/310 |

* cited by examiner

*Primary Examiner* — James Harvey
(74) *Attorney, Agent, or Firm* — Jacobson Holman, PLLC (57) ABSTRACT

A plug connector to connect electrical conductors, comprising a housing of the plug connector formed as a single piece and provide an unlocking mechanism in the housing which is triggered by operating a tab on a cable connection side.
A latching mechanism which is located on the exterior of the housing can be shifted into the housing by triggering the unlocking mechanism, forming a latch with a mating plug.

8 Claims, 7 Drawing Sheets

PLUG CONNECTOR

This is a national stage of PCT/DE11/075,185 filed Aug. 3, 2011 and published in German, which has a priority of German no. 10 2010 055 434.0 filed Dec. 21, 2010, hereby incorporated by reference.

BACKGROUND AND SUMMARY OF INVENTION

The invention consists of a plug connector for connecting electrical conductors, consisting of a housing which possesses a plug side formed using a conductor plate and a cable connection side, and possesses latching mechanisms intended to latch into a mating plug.

Such a plug connector is required to create a detachable connection between the veins of a cable with contacts located in a mating plug. Herein, it must be ensured that both the electrical and the mechanical contact between the plug connector and the mating plug is guaranteed, and that it is possible to release the connection in a simple manner.

STATE OF THE ART

A cable connector for insertion into a plug-in module is known from U.S. Pat. No. 7,297,028 B2, wherein the cable connector has a protrusion with which the cable connector latches into the plug-in module. An unlocking lever is located on the exterior of the cable connector; when it is operated, it elastically alters the shape of part of the plug-in module, thereby unlocking the cable connector.

U.S. Pat. No. 7,690,939 B2 furthermore describes an electronic module which possesses a housing with a latching mechanism, wherein the latching mechanism consists of a sliding element and a lever. The module is inserted into a cage and latched into a spring element of the cage by means of a latching tab. Operating the lever axially shifts the sliding element, thereby raising the spring element of the cage and consequently releasing the lock of the module.

It is a disadvantage in the state of the art that the mechanical elements of the device are mounted on the exterior of the modules or plugs. The effects of external influences such as dust or dirt may lead to a situation in which the mechanical interplay of these elements can no longer be guaranteed. This may result in failure of the unlocking mechanism, meaning that the module or plug cannot be unlocked and removed.

PROBLEM

The invention is therefore based on the problem that a plug connector must be formed in such a manner that following automatic locking with a mating plug, it is no longer guaranteed that the plug connector can be unlocked with simple handling. Furthermore, easy assembly of the unlocking mechanism and the plug connector should be possible, with few components.

This problem is solved by forming the housing as a single piece, whose interior contains an unlocking mechanism which is triggered by a tab; that the unlocking mechanism acts on the external latching mechanism from the interior of the housing; and that the unlocking mechanism possesses a gliding element which can move along the longitudinal axis of the plug connector, as well as an unlocking element which can be moved vertically in relation to the longitudinal axis of the plug connector, wherein the gliding element and the unlocking element are connected to each other in a movable manner and interact so that the motion of the gliding element along the longitudinal axis of the plug connector causes the unlocking element to move vertically in relation to the longitudinal axis of the plug connector. Advantageous embodiments of the invention are described in the sub-claims.

The invention consists of a plug connector which is formed by a housing which possesses a plug side and an opposing cable connection side. The plug side of the housing is formed by a conductor plate which represents the contacts of the plug connector. When the plug connector is connected to a mating plug, the conductor plate makes contact with the contacts located in the mating plug, thereby creating an electrical connection between the plug connector and the mating plug.

On the cable connection side of the housing, a cable which must be connected leads into the housing of the plug connector. The veins of the connected cable are separated into individual veins in the housing and are connected to the conductor plate in an electrically conductive manner. On the exterior of the housing, latching mechanisms which ensure mechanical latching of the plug connector into a mating plug are mounted. The latching mechanism, which is flat on the plug side, latches into an opening when the plug connector is connected to the mating plug; this opening is located in a spring element of the mating plug.

The advantages obtained with the invention particularly lie in that the housing of the plug connector is formed as a component with only one part. It is furthermore a special advantage that the unlocking mechanism which makes it possible to disconnect the plug connector from a mating plug is contained in the interior of the housing. A tab which is connected to the unlocking mechanism and leads out of the housing is provided for unlocking the mechanism.

In a preferred embodiment, the unlocking mechanism which is located inside the housing acts on the latching mechanism which lies against the exterior surface of the housing. Due to a motion of the tab which is located on the cable connection side of the housing, against the plug direction of the plug connector, the latching mechanism is shifted from its position on the outside of the housing into the housing. This releases the latch connection with the spring element of the mating plug, thereby enabling the plug connector to be disconnected from the mating plug.

In a feasible embodiment, the unlocking mechanism is formed by two elements within the interior of the plug connector. A first element is positioned along the longitudinal axis of the plug connector and can be moved along a specific path. The second element of the unlocking mechanism is positioned vertically in relation to the longitudinal axis of the plug connector and can be moved along a specific path. The latching mechanism to latch with the mating plug is preferably mounted on the second, U-shaped element which is integrated into the exterior of the housing. Due to a mobile connection of the first element with the second element, the movement of the first element along the longitudinal axis of the plug connector causes a movement of the second element vertically in relation to the longitudinal axis of the plug connector, into the housing.

An advantageous embodiment of the unlocking mechanism provides that the first element possesses guiding grooves which guide guiding tabs that are mounted on the second element. The guiding grooves of the first element are arranged at an angle to the longitudinal axis of the plug connector in such a manner that they move away from the second element from the cable connection side to the plug side.

In another preferred embodiment, the tab for operating the unlocking mechanism is mounted on the cable connection side of the plug connector on the first element of the unlocking mechanism. The tab, which extends along the connected cable, can be mounted above or below the cable. For this purpose, it is intended to mount the tab along its longitudinal axis, rotated by 180°.

In order to guarantee that the plug connector latches into a mating plug, a feasible embodiment provides a spring in the interior of the housing which acts on the unlocking mechanism. The spring, which preferably acts on the first element, causes the unlocking mechanism to lock automatically.

Further embodiments of the invention are described in the sub-claims.

EXEMPLARY EMBODIMENT

An exemplar embodiment of the invention is shown in the diagram and is explained in further detail below. The following show:

DETAILED DESCRIPTION

Figure 1A:
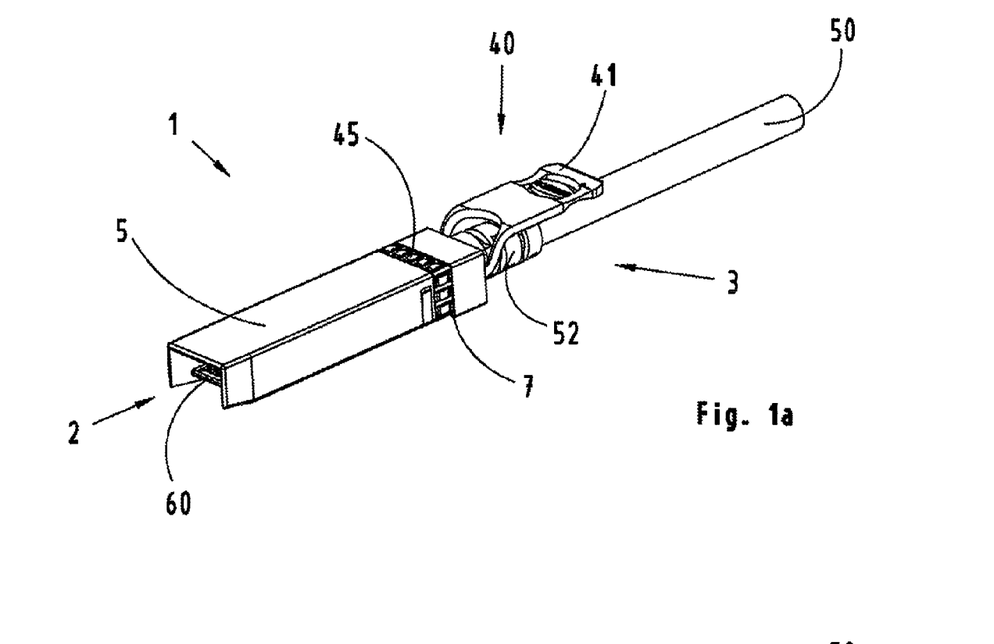
FIG. 1a a plug connector in a spatial view.

FIG. 1a shows a plug connector 1 shown in a spatial view, with a plug side 2 and a cable connection side 3. The plug connector 1 consists of a housing 5 within which a conductor plate 60 is located on the plug side 2; the plug connector 1 can be connected to a mating plug 70 via this conductor plate. On the cable connection side 3 of the plug connector 1, a cable 50 which is to be connected leads into the plug connector 1. In this embodiment, an anti-kink device 52 is provided on the cable connection side 3 to protect the cable 50. On the cable connection side, a tab 40 which serves to trigger an unlocking mechanism leads into the housing 5. A grip end 41 of the tab 40 is herein located above the connected cable 50. On the housing 5, a ground strap 45 is also mounted in a groove 7; this allows a ground contact from the plug connector 1 to the mating plug 70.

Figure 1B:
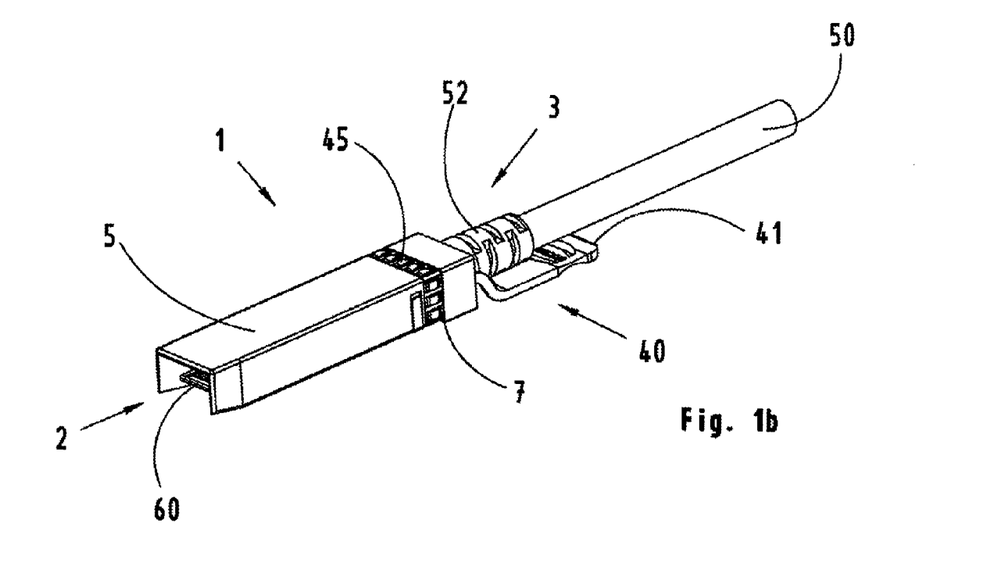
FIG. 1b a plug connector with a tab which has been mounted in the rotated position, in a spatial view.

FIG. 1b shows the plug connector 1 as shown in FIG. 1a, wherein the tab 40 for operating the unlocking mechanism is rotated by 180° along its longitudinal axis in this embodiment as it leads into the housing 5. Due to this, the grip end 41 of the tab 40 is located below the connected cable 50.

Figure 2:
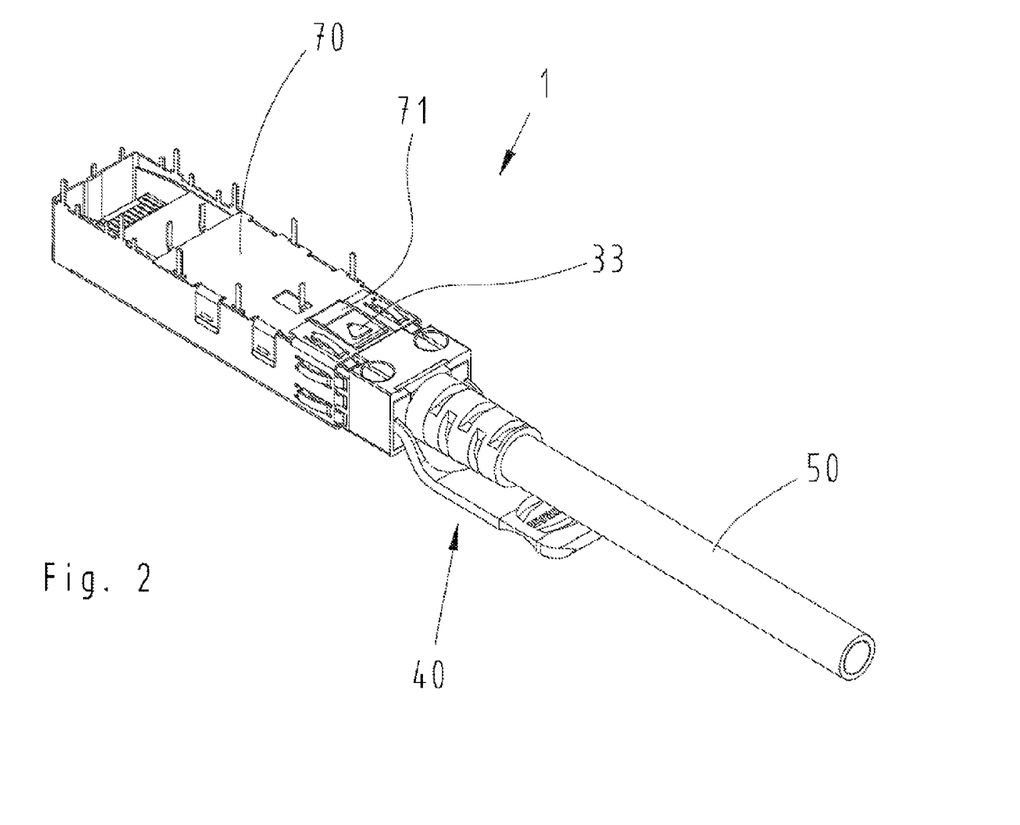
FIG. 2 a plug connector which is plugged into a mating plug, in a spatial view.

FIG. 2 shows the plug connector 1 connected to a mating plug 70. The plug connector 1 possesses a latching mechanism 33 which is latched into a spring element 71 in the mating plug 70, wherein the spring element 71 is arrayed within the mating plug 70.

Figure 3:
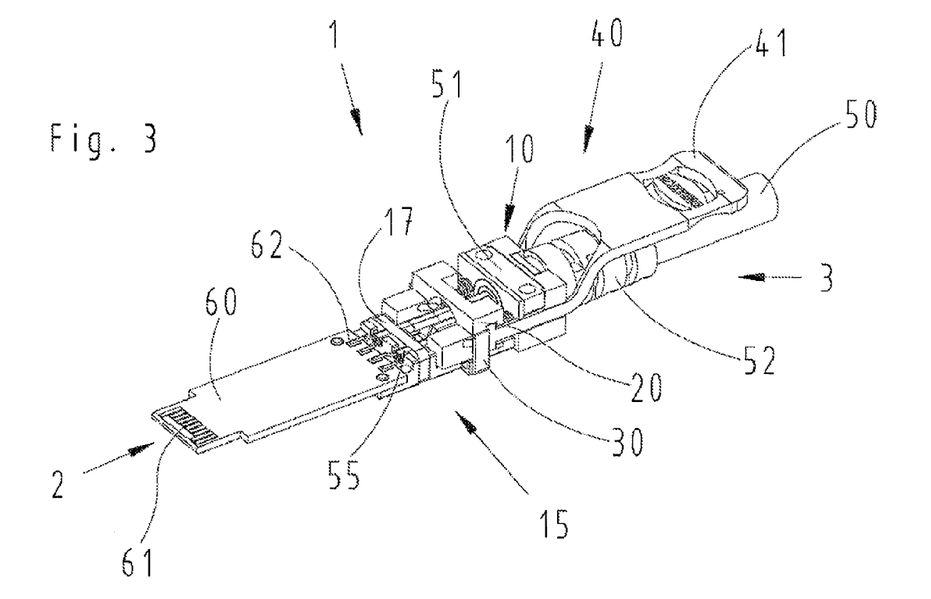
FIG. 3 a plug connector without a housing, in a spatial view.

FIG. 3 shows the plug connector 1 in a spatial view, without the housing 5. On the conductor plate 60 which forms the plug side 2 of the plug connector 1, plug connectors 61 are provided to create an electrical contact with the mating plug 70. On the opposing side, the conductor plate 60 is fastened to a carrier element 10 and possesses cable connection contacts 62 with which veins 55 of the connected cable 50 make contact. The veins 55 of the cable 50 are held in pairs in a cable separator 15 using a clamping bracket 17. On the cable connection side 3, the carrier element 10 possesses a strain relief device 51 and an anti-kink device 52 for the connected cable 50.

The carrier element 10 furthermore ensures that the conductor plate 60, the veins 55 and the cable 50 can be fixed in relation to each other. It is not possible to shift the conductor plate 60, the veins 55 and the cable 50 in relation to each other, and it is easy to perform the assembly and fastening of the veins 55 on the cable connection contacts 62 of the conductor plate 60.

The unlocking mechanism which is shown in FIG. 3 and which is arrayed in the central area of the carrier element 10 is formed out of two parts:
a gliding element 20 and an unlocking element 30. In the direction of the cable connection side 3, the tab 40 is mounted on the gliding element 20 in accordance with the invention, to operate the unlocking mechanism. In this embodiment, the tab 40 is mounted so that the grip end 41 of the tab 40 is located above the connected cable 50.

Figure 4:
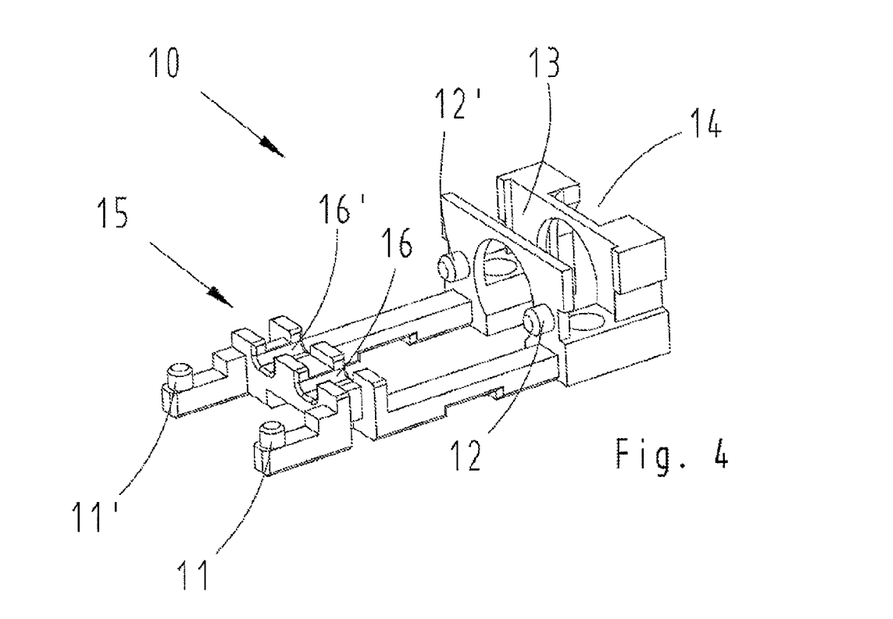
FIG. 4 an individual carrier element, in a spatial view.

FIG. 4 shows a carrier element 10 in a spatial view. In the frontal area of the carrier element 10 on the plug side, fastenings are provided for the conductor plate 60; in this embodiment, these consists of two pins 11, 11' which are received by two drilled holes 63, 63' in the conductor plate 6. In the direction of cable connection, a cable separator 15 is arrayed on the carrier element 10 behind the pins 11, 11'; here, this consists of two recesses 16, 16' which extend in the longitudinal plug direction. Each of the recesses 16, 16' is provided to receive one of the double veins of cable 50.

The central area of the carrier element 10 is provided to receive the gliding element 20 and the unlatching element 30 of the unlocking mechanism.

On the rear, cable connection side of the carrier element 10, two spring recesses 12, 12' are provided in the axial direction. The end of the carrier element 10 is formed out of a strain relief device receiving opening 13 and an anti-kink device receiving opening 14 to fasten the strain relief device 51 and the anti-kink protection device 52.

Figure 5:
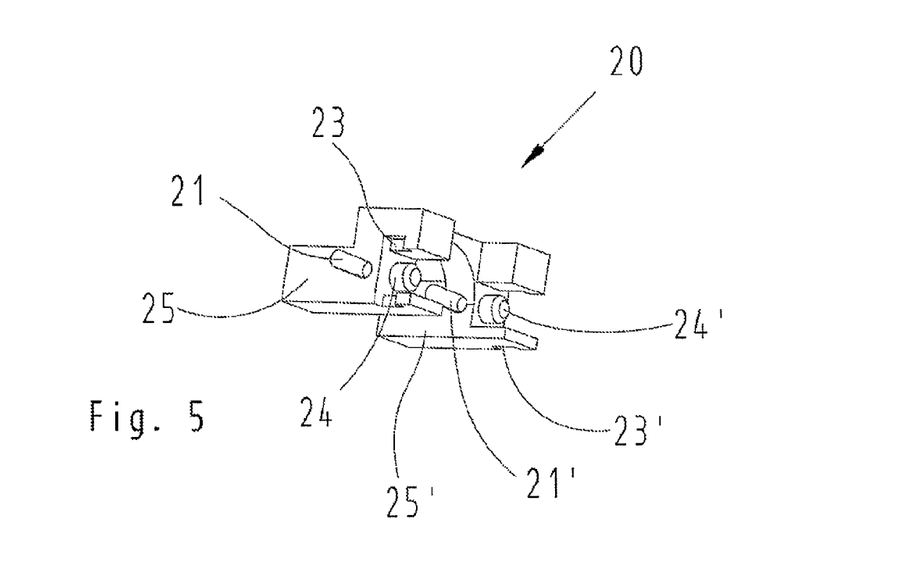
FIG. 5 an individual gliding element of the unlocking mechanism, in a spatial view.

FIG. 5 shows a gliding element 20 in a spatial view from the direction of the cable connection side 3. The gliding element 20 is formed as a U-shaped extruded part from two shanks 25, 25', wherein the connected cable 50 is led between the two shanks 25, 25'. In accordance with the invention, the gliding element 20 possesses two guiding grooves 21, 21' which are angled in relation to the longitudinal plug axis. The guiding grooves 21, 21' are formed as oblong holes in shanks 25, 25' of the gliding element 20 in this embodiment. In the assembled state, guiding tabs 32, 32' of the unlatching element 30 are arrayed in the guiding grooves 21, 21'.

It is practical for the gliding element 20 to also possess two T-shaped recesses 23, 23' on the outsides of the two shanks 25, 25' on the cable connection side. These are intended for fastening the tab 40. Furthermore, a pin shaped spring receiving recess 24, 24' is provided on the cable connection side on each of the shanks 25, 25'.

Figure 6:
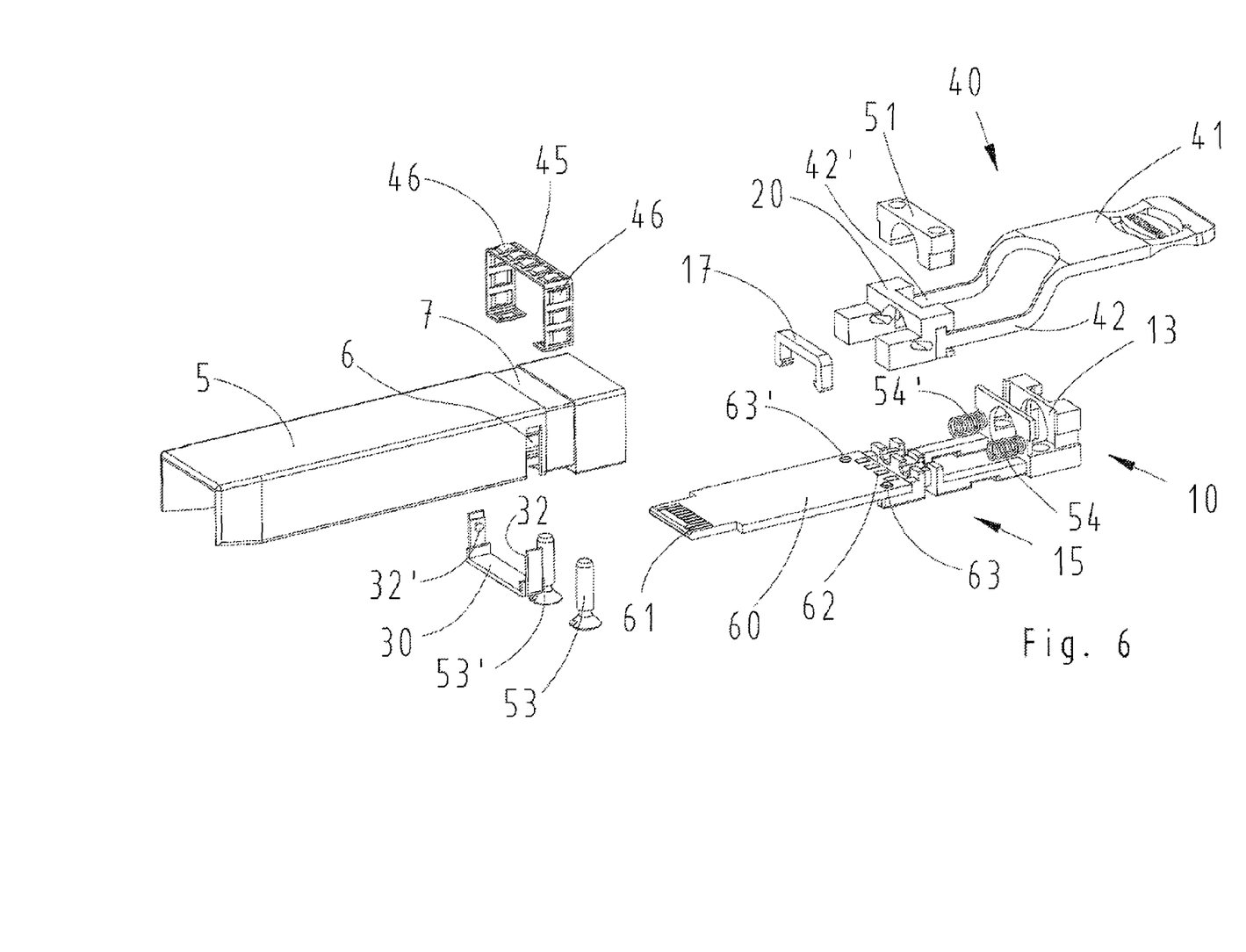
FIG. 6 a plug connector in a spatial explosion view.

A spatial explosion view of the plug connector 1 is shown in FIG. 6. On the housing 5, one can see the groove 7 which receives the ground strap 45 in the assembled state. The ground strap 45 possesses contact fingers 46 which point against the plug direction, unfixed on three sides, and bent outwards in a barrel shape, which enable an electrical contact of the ground potential of the plug connector 1 to the mating plug 70.

For the final assembly of the carrier element 10 with the elements which are attached to it in the housing 5, two screws 53, 53' which are used to affix the carrier element 10 in the housing 5 are provided in this embodiment.

On the conductor plate 60, plug contacts 61 for contacting in a mating plug 70 can be seen on the plug side. On the cable connection side of the conductor plate 60, there are cable connection contacts 62 for connecting individual veins 55 of the cable 50 which is to be connected. Furthermore, the conductor plate 60 contains two drill holes 63, 63' in order to connect the conductor plate 60 to the carrier element 10. To allow the problem-free connection of the veins 55 to the conductor plate 60, the cable separator 15 is arrayed directly behind the cable connection contacts 62 on the carrier element 10. The cable separator 15 consists of (here) two recesses 16, 16' which extend in the longitudinal direction of the plug and which each receive a double vein 55 of the cable 50 which is to be connected. The veins 55 which are placed in the recesses 16, 16' are clamped into the cable separator 15 by means of the clamping bracket 17.

Furthermore, FIG. 6 shows the tab 40 which is formed out of a grip end 41 and two fastening ends 42, 42'. The fastening ends 42, 42' which are T-shaped here grip into the correspondingly T-shaped recesses 23, 23' in the gliding element 20 of the unlocking mechanism from the cable connection side 3 herein.

There are two recognizable lateral guiding grooves 21, 21' in the gliding element 20 which are inclined towards the longitudinal axis of the plug connector. The guiding grooves 21, 21' lie at the rear end towards the cable connection, close to the unlocking element 30, and run forward, towards the end on the plug side, away from the unlocking element 30. Guiding tabs 32, 32' of the unlocking element 30 laterally grip into the two guiding grooves 21, 21'. The guiding tabs 32, 32' connect the gliding element 20 with the unlocking element 30 in a moveable manner.

Out of a linear motion of the gliding element 20 along the plug connector axis, this results in a linear motion of the unlocking element 30 vertically in relation to the plug connector axis. The unlocking element 30 is herein guided within an opening 6 in the housing 5 which is provided for this purpose, in a linear direction. For practical purposes, the opening 6 is formed as a slit which is formed on three sides in the housing 5.

In order to ensure automatic locking when plugging the plug connector 1 into a mating plug 70 using the unlocking mechanism, the invention provides for two springs 54, 54'. These grip into the spring receiving recesses 24, 24' of the gliding element 20 and the spring receiving recesses 12, 12' of the carrier element 10, and apply force to the gliding element 20 in the plug direction.

FIG. 6 furthermore shows the strain relief device 51 which is provided in this embodiment. The connected cable 50 is clamped herein, which avoids traction pressure on the cable separator 15 as well as the cable connection contacts 62. The pressure relief device 51 is screwed into the carrier element 10 in the pressure relief device recess 13 using the screws 53, 53'.

Figure 7A:
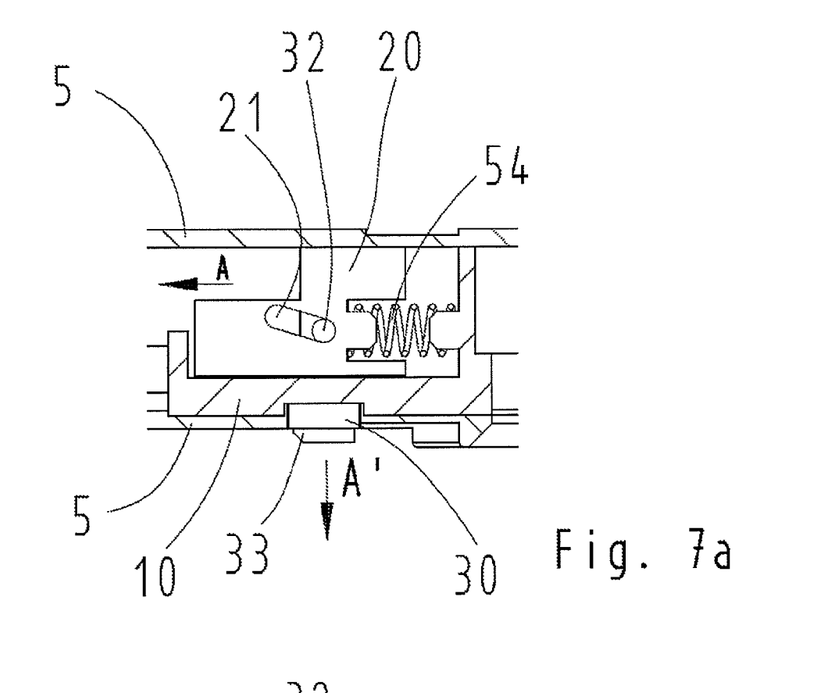
FIG. 7a a detailed view of the unoperated unlocking mechanism.
Figure 7B:
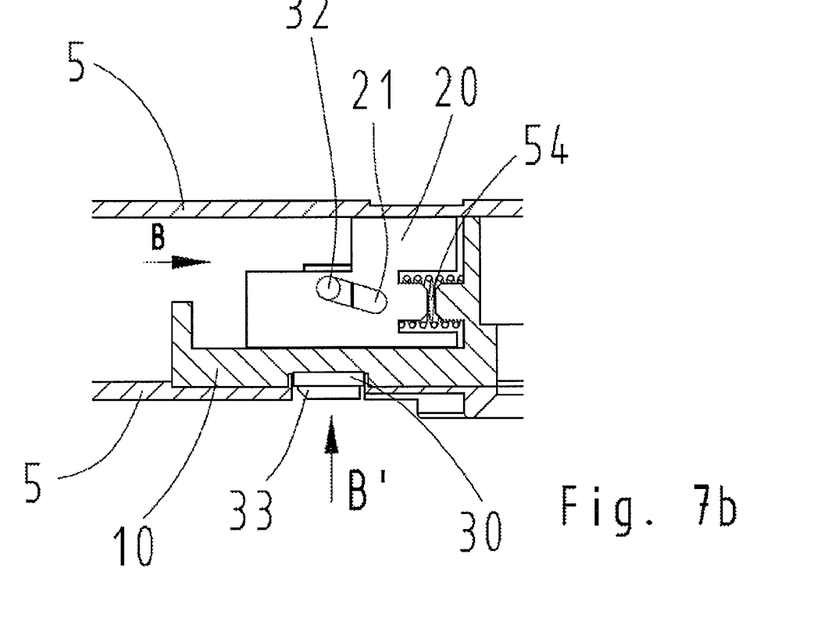
FIG. 7b a detailed view of the operated unlocking mechanism.

FIGS. 7a and 7b show detailed views of the plug connector 1 in a sectional view, showing the unlocking mechanism.

FIG. 7a shows the housing 5 and the carrier element 10 which is located within it. The gliding element 20 and the unlocking element 30 of the unlocking mechanism are arrayed on the carrier element 10, as well as a shown spring 54. The spring 54 presses the gliding element 20 into a frontal locking position A in the shown position. Accordingly, the guiding tabs 32 of the unlocking element 30 are located in a lower end position in the guiding grooves 21 of the gliding element 20. Consequently, the unlocking element 30 is located in a lock position A', so that the latching mechanism 33 which is located outside the housing 5 on the unlocking element 30 can latch into the spring element 71 of the mating plug 70.

FIG. 7b, in accordance with FIG. 7a, shows the unlocking mechanism of the' plug connector 1 in the unlocked state. By pulling the tab 40, the gliding element 20 is shifted into a rear unlocking position B against the force applied by the springs 54. The guiding tabs 32 of the unlocking element 30 are located in an upper end position in the guiding grooves 21 of the gliding element 20. The unlocking element 30 is thereby shifted into an unlocking position B' in such a manner that the latching mechanism 33 is shifted into the housing and a latch with the spring element 71 of a mating plug 70 is released. By releasing the tab 40, the springs 54 force the unlocking mechanism to return to the locking position A, A' in accordance with FIG. 7a.

Figure 8A:
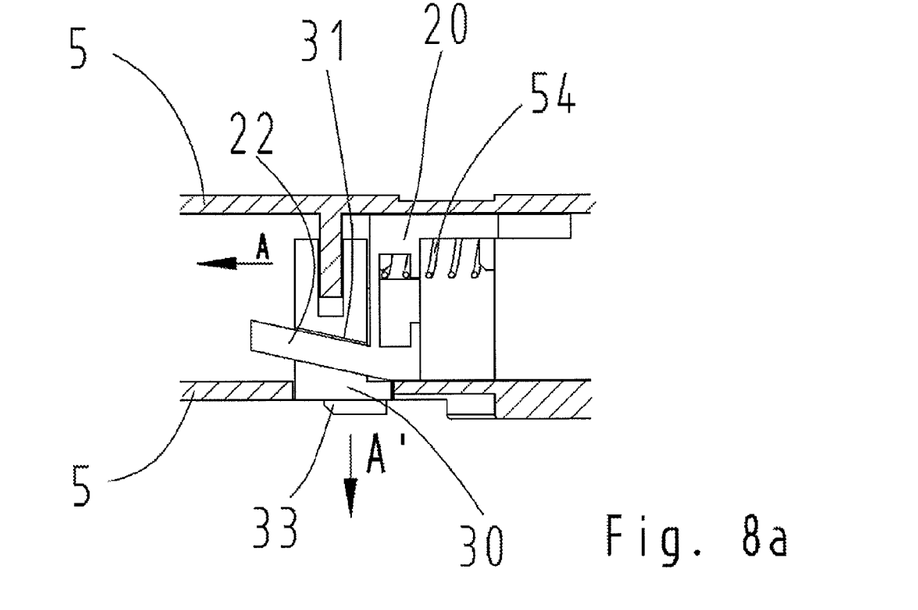
FIG. 8a a detailed view of a second embodiment of the unoperated unlocking mechanism.
Figure 8B:
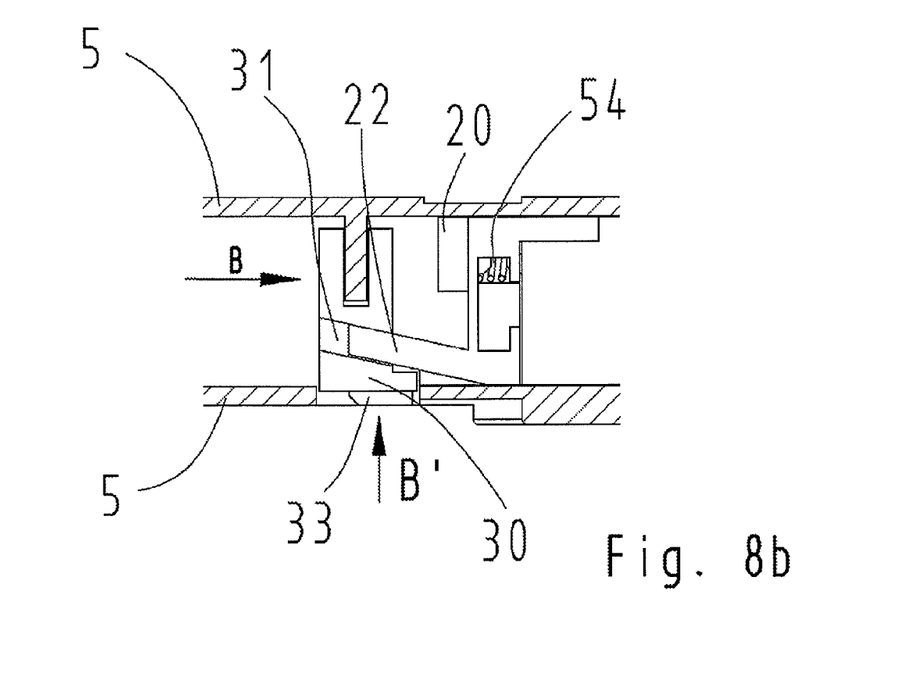
FIG. 8b a detailed view of the second embodiment of the operated unlocking mechanism.

FIGS. 8a and 8b represent a second embodiment of the unlocking mechanism shown in FIGS. 7a and 7b in the locking position A, A' and the unlocking position B, B'. The function of the unlocking mechanism is identical to the function in FIGS. 7a and 7b. In this embodiment, however, the gliding element 20 possesses guiding tabs 22, 22' which grip into guiding grooves 31, 31' of the unlocking element 30. In accordance with the exemplary embodiment of FIGS. 7a and 7b, there are both locking positions A, A' and unlocking positions B, B' of the gliding element 22 and the unlocking element 26.

REFERENCES

Plug Connector

1 Plug connector
2 Plug side
3 Cable connection side
5 Housing
6 Unlocking element opening
7 Groove
10 Carrier element
11, 11' Pins
12, 12' Spring receiving recess
13 Strain relief device recess
14 Anti-kink protection device recess
15 Cable separator
16, 16' Recesses
17 Clamping bracket
20 Gliding element
21, 12' Guiding grooves
22, 22' Guiding tabs
23, 23' Recesses, T-shaped
24, 24' Spring receiving recesses
25, 25' Shanks
30 Unlocking mechanism
31, 31' Guiding grooves
32, 32' Guiding tabs
33 Latching mechanism
40 Tab
41 Grip end
42, 42' Fastening ends, T-shaped
45 Ground strap 46 Contact fingers
50 Cable
51 Strain relief device
52 Anti-kink protection device
53, 53' Screw
54, 54' Spring
55 Vein
60 Conductor plate
61 Plug contacts
62 Cable connection contacts
63, 63' Drill hole
70 Mating plug
71 Spring element

The invention claimed is:

1. Plug connector for connecting electrical conductors, consisting of a housing (5) with a plug side (2) which is formed using a conductor plate (60) and a cable connection side (3) which is equipped with a latching mechanism (33) to latch into an mating plug (70) and an unlocking mechanism which can be triggered using a strap (40), wherein the unlocking mechanism possesses a gliding element (20) which can shift along the longitudinal axis of the plug connector, wherein the housing (5) is formed as a single piece and its interior contains the unlocking mechanism, the unlocking mechanism acts from the interior of the housing (5) on the latching mechanism (33) which is located on the outside, and the unlocking mechanism possesses an unlocking element (30) which can move vertically in relation to the longitudinal axis of the plug connector, the gliding element (20) and the unlocking element (30) are connected with each other in a moveable manner and interact in such a manner that the motion of the gliding element (20) along the longitudinal axis of the plug connector causes a motion of the unlocking element (30) which is vertical in relation to the longitudinal axis of the plug connector, and pulling on the strap (40) which is located on the cable connection side (3) against the plug direction of the plug connector (1) causes the unlocking mechanism to pull the latching mechanism (33) into the housing (5) and thereby releases the latch to the mating plug (70).

2. Plug connector to connect electrical conductors according to claim 1,
wherein
the gliding element (20) of the unlocking mechanism possesses guiding grooves (21, 21') which are arranged at an angle to the longitudinal axis of the plug connector, into which guiding tab (32, 32') unlocking elements (30) grip.

3. Plug connector for connecting electrical conductors in accordance with claim 1,
wherein
the unlocking element (30) of the unlocking mechanism possesses guiding grooves (31, 31') which are arranged at an angle to the longitudinal axis of the plug connector, into which guiding tabs (22, 22') of the gliding element (20) grip.

4. Plug connector for connecting electrical conductors in accordance with claim 1,
wherein
the latching mechanism (33) for locking the plug connector (1) with the mating plug (70) is mounted on the on the unlocking element (30) of the unlocking mechanism.

5. Plug connector for connecting electrical conductors in accordance with claim 1,
wherein
the tab (40) to operate the unlocking mechanism is fastened on the side of the gliding element which faces the direction of the cable connection side (3), and can be mounted both at the top and rotated by 180° along its longitudinal axis below an electrical cable (50) which is to be connected.

6. Plug connector for connecting electrical conductors in accordance with claim 1,
wherein
a spring (54) acts on the unlocking mechanism and thereby automatically causes the unlocking mechanism to lock.

7. Plug connector for connecting electrical conductors in accordance with claim 1,
wherein
the housing (5) of the plug connector (1) contains a cable separation device (15) for orderly affixation and direct contacting of individual veins (55) of a connected electrical cable (50) on the conductor plate (60).

8. Plug connector for connecting electrical conductors in accordance with claim 1,
wherein
the housing (5) of the plug connector (1) includes an electrically conductive strip (45) to provide a ground contact for the plug connector (1) to the mating plug (70).

* * * * *